(12) United States Patent
Yuan

(10) Patent No.: US 9,590,947 B2
(45) Date of Patent: Mar. 7, 2017

(54) IP MANAGEMENT METHOD, CLIENT AND SERVER

(71) Applicant: Tencent Technology (Shenzhen) Company Limited, Shenzhen, Guangdong (CN)

(72) Inventor: Shuai Yuan, Guangdong (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 0 days.

(21) Appl. No.: 15/175,563

(22) PCT Filed: Feb. 10, 2015

(86) PCT No.: PCT/CN2015/072652
§ 371 (c)(1),
(2) Date: Jun. 7, 2016

(87) PCT Pub. No.: WO2015/090243
PCT Pub. Date: Jun. 25, 2015

(65) Prior Publication Data
US 2016/0323238 A1    Nov. 3, 2016

(30) Foreign Application Priority Data
Dec. 17, 2013    (CN) .......................... 2013 1 0695074

(51) Int. Cl.
*G06F 15/16*    (2006.01)
*H04L 29/12*    (2006.01)
(Continued)

(52) U.S. Cl.
CPC ...... *H04L 61/1541* (2013.01); *H04L 61/1511* (2013.01); *H04L 61/2007* (2013.01); *H04L 67/327* (2013.01); *H04L 67/42* (2013.01)

(58) Field of Classification Search
CPC .................................................. H04L 61/1541
(Continued)

(56) References Cited

U.S. PATENT DOCUMENTS 7,725,602 B2    5/2010   Liu et al.
7,747,749 B1    6/2010   Erikson et al.
(Continued)

FOREIGN PATENT DOCUMENTS

CN    101822022 A    9/2010
CN    101989986 A    3/2011
(Continued)

OTHER PUBLICATIONS

Written Opinion of the International Searching Authority received in PCT Application No. PCT/CN2015/072652, mailed Mar. 27, 2015.
(Continued)

*Primary Examiner* — Andrew Georgandellis
(74) *Attorney, Agent, or Firm* — Brinks, Gilson & Lione

(57) ABSTRACT

An IP management method, a client and a server. The method comprises: searching, by a client, a first correlation table, and determining an IP address of a server corresponding to the type of a service to which the client needs access, the first correlation table being a table of the correlation between the IP address of the server in a service cluster saved by the client and the type of the service; sending, by the client, an access request to a server corresponding to the determined IP address of the server, the access request containing the type of the service to which the client needs access; and receiving, by the client, access data which is fed back by the server and corresponds to the type of the service to which the client needs access.

11 Claims, 6 Drawing Sheets

(51) Int. Cl.
*H04L 29/08* (2006.01)
*H04L 29/06* (2006.01)

(58) Field of Classification Search
USPC .......................................................... 709/245
See application file for complete search history.

(56) References Cited

U.S. PATENT DOCUMENTS

| | | | |
|---|---|---|---|
| 8,156,199 | B1 | 4/2012 | Hoche-Mong et al. |
| 8,195,763 | B2 | 6/2012 | Knowles et al. |
| 9,215,205 | B1* | 12/2015 | Smith ................. H04L 61/1511 |
| 2005/0044165 | A1 | 2/2005 | O'Farrell et al. |
| 2008/0298366 | A1 | 12/2008 | Appiah et al. |
| 2009/0097492 | A1 | 4/2009 | Monette et al. |
| 2009/0222584 | A1* | 9/2009 | Josefsberg ........ H04L 29/12066 709/245 |
| 2012/0179801 | A1* | 7/2012 | Luna ................... H04L 61/6009 709/223 |

FOREIGN PATENT DOCUMENTS

| | | |
|---|---|---|
| CN | 102420916 A | 4/2012 |
| CN | 103428302 A | 12/2012 |
| TW | I245997 | 12/2005 |

OTHER PUBLICATIONS

International Search Report with Notification received in PCT Application No. PCT/CN2015/072652, mailed Mar. 27, 2015.
Office Action dated Jan. 12, 2016 for Taiwanese Application No. 103144126, 7 pages.

\* cited by examiner

IP MANAGEMENT METHOD, CLIENT AND SERVER

The present application is a national phase of International Application No. PCT/CN2015/072652, titled "IP MANAGEMENT METHOD CLIENT AND SERVER", filed on Feb. 10, 2015, which claims the priority to Chinese Patent Application No. 201310695074.7, titled "IP MANAGEMENT METHOD, CLIENT DEVICE AND SERVER", filed with the Chinese State Intellectual Property Office on Dec. 17, 2013, both of which are incorporated herein by reference in its-entirety.

FIELD

The disclosure relates to communication technology, and in particular to an Internet Protocol (IP) management method, a client device and a server.

BACKGROUND

At present, a client device needs to send an IP address inquiry request to a proxy server or a domain name system (DNS) server in a case that the client device wants to use a service. The IP address inquiry request includes a type of the service requested by the client device. The proxy server or the DNS server searches for an IP address of a server which is capable of providing this type of service for the client device in saved correspondence between the IP addresses and the types of services, and sends the determined IP address of the server to the client device, so that the client device accesses the server with the IP address to enjoy required service.

In such a process, the client device desiring the service has to send the IP address inquiry request to the proxy server or the DNS server for determining the IP address of the server which is capable of providing corresponding service. Any fault in the proxy server or the DNS server may results in the case that no client device can be accurately connected to the server able to serving the client device. In addition, the client device needs to update the saved IP address of the proxy server or the DNS server if the IP address of the proxy server or the DNS server is changed, resulting in high maintenance cost for the client device. Hence, such an IP management mode has high cost and low reliability.

SUMMARY

An IP management method, a client device and a server are provided according to the embodiments of the disclosure to solve the above problems.

An IP management method is provided according to the disclosure, includes:

looking up, by a client device, in a first correspondence table to determine an IP address of a server corresponding to a type of service to which the client device is to access, wherein the first correspondence table is saved by the client device and stores correspondence between IP addresses of servers and types of services in a service cluster;

sending, by the client device, an access request to the server corresponding to the determined IP address, wherein the access request comprises information indicating the type of service to which the client device is to access; and receiving, by the client device, access data fed back by the server, wherein the access data corresponds to the type of service to which the client device is to access.

An IP management method is provided according to the disclosure, and includes:

receiving, by a first server, an access request sent by a client device, wherein the access request comprises information indicating a type of service to which the client device is to access and a latest update time of a first correspondence table saved by the client device, wherein the first correspondence table is saved by the client device and stores correspondence between IP addresses of servers and types of services in a service cluster; and feeding back, by the first server, access data corresponding to the type of service to which the client device is to access and update data for the first correspondence table based on the access request, wherein the update data represents data updated in a second correspondence table during a period from a latest update time of the first correspondence table to a current time, and the second correspondence table is saved by the first server and stores correspondence between the IP addresses of servers and the types of services in the service cluster.

A client device is provided according to the disclosure, includes one or more processors and storage media storing instructions, wherein when executing the instructions, the one or more processors are configured for:

looking-up in a first correspondence table to determine an IP address of a server corresponding to a type of service to which the client device is to access, wherein the first correspondence table is saved by the client device and stores correspondence between IP addresses of servers and types of services in a service cluster;

sending, an access request to the server corresponding to the determined IP address, wherein the access request comprises information indicating the type of service to which the client device is to access; and receiving, access data fed back by the server, wherein the access data corresponds to the type of service to which the client device is to access.

A server is provided according to the embodiments of the disclosure, includes one or more processors and storage media storing instructions, wherein when executing the instructions, the one or more processors are configured for:

receiving an access request sent by a client device, wherein the access request comprises information indicating a type of service to which the client device is to access and a latest update time of a first correspondence table saved by the client device, wherein the first correspondence table is saved by the client device and stores correspondence between IP addresses of servers and types of services in a service cluster; and feeding back access data corresponding to the type of service to which the client device is to access and update data for the first correspondence table based on the access request, wherein the update data represents data updated in a second correspondence table during a period from a latest update time of the first correspondence table to a current time, and the second correspondence table is saved by the first server and stores correspondence between IP addresses of servers and types of services in the service cluster.

In the technical solution according to the embodiments of the disclosure, when a client device is to access a server, the client device looks up in a first correspondence table to determine an IP address of a server corresponding to the type of service to which the client device is to access, where the first correspondence table is saved by the client device and stores correspondence between IP addresses of servers in the service cluster and types of services; the client device may send an access request to the server corresponding to the determined IP address, where the access request contains information indicating the type of service to which the client device is to access; and the client device receives access data which is fed back by the server and corresponds to the type of service to which the client device is to access. In the technical solution according to the embodiments of the disclosure, the client device may search for the IP address of the server based on the first correspondence table saved by itself, and does not need to obtain the IP address of the server from the proxy server or the DNS server. Hence, the problems of high cost and low reliability caused by the fault of the proxy server or the DNS server or a change of the IP address are resolved effectively, the cost of IP management is reduced, and the reliability of the system is improved.

DETAILED DESCRIPTION OF THE EMBODIMENTS

An IP management method, a client device and a server are provided according to the embodiments of the disclosure, which are described in detail by reference to specific embodiments as follows.

To make purpose, features and advantages of the disclosure more apparent and easier to be understood, the technical solutions according to the embodiments of the disclosure will be described clearly and completely as follows in conjunction with the drawings in the embodiments of the disclosure. It is apparent that the described embodiments are merely a few of the embodiments of the disclosure rather than all embodiments. All other embodiments obtained by those skilled in the art without any creative work based on the embodiments in the disclosure will fall within the scope of protection of the disclosure.

The terms such as "first", "second", "third" and "fourth" used in the specification, the claims and the drawings of the disclosure are only used to distinguish one object from another similar object, and do not necessarily indicate particular order or precedence of the objects. It should be understood that these terms used in this way can be exchanged in appropriate circumstances, so that the embodiments described in the disclosure can be implemented in an order other than those shown or described here. In addition, the terms "include", "have" and any variances thereof are intended to be non-exclusive. For example, a process, method, system, article or device including a plurality of steps or elements includes not only the explicitly listed steps or elements but also other steps or elements that are not explicitly enumerated, or also include the elements inherent for the process, method, article or device.

In the embodiments of the disclosure, the IP management system includes multiple client devices and multiple servers, and the multiple servers constitute a service cluster. Each server in the service cluster saves the correspondence between the IP addresses of all the servers in the service cluster and the types of services, and each client device performing service accesses from the server in the service cluster saves the correspondence between the IP address of the server in the service cluster and the type of service.

Figure 1:
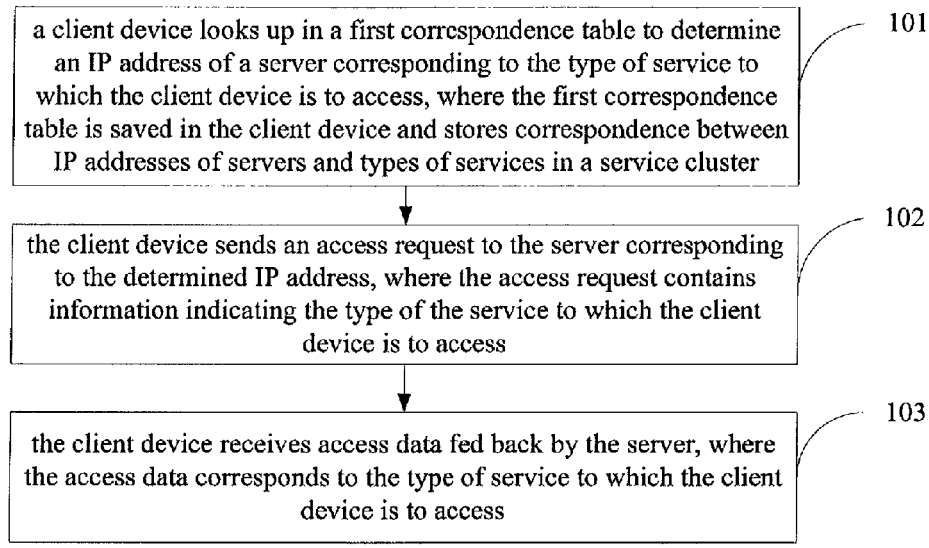
FIG. 1 is a schematic flowchart of an IP management method according to an embodiment of the disclosure.

FIG. 1 is a schematic flowchart of an IP management method according to an embodiment of the disclosure, and the method includes following steps 101 to 103.

In step 101, a client device looks up in a first correspondence table to determine an IP address of a server corresponding to the type of service to which the client device is to access, where the first correspondence table is saved in the client device and stores correspondence between IP addresses of servers and types of services in a service cluster.

For example, the client device, wishing to access a social network, looks up in the first correspondence table to determine the IP address of the server capable of providing service of accessing the social network for the client device.

In the embodiment of the disclosure, the client device may be a personal computer, a tablet computer, a mobile phone or other terminal devices.

In step 102, the client device sends an access request to the server corresponding to the determined IP address, where the access request contains information indicating the type of the service to which the client device is to access.

For example, once determining the IP address of the server, which is capable of providing access to the social network, as 171.17.1.14, the client device sends the access request to the server, where the access request carries a web address of the social network so that the server can feed back access data accordingly.

In step 103, the client device receives access data fed back by the server, where the access data corresponds to the type of service to which the client device is to access.

In the embodiments of the disclosure, the client device wishing to access a service looks up in a first correspondence table to determine an IP address of a server corresponding to the type of the service to which the client device is to access, where the first correspondence table is saved in the client device and stores correspondence between IP addresses of servers and types of services in the service cluster; the client device may send an access request to the server corresponding to the determined IP address, where the access request contains information indicating the type of service to which the client device is to access; and the client device receives access data which is fed back by the server and corresponds to the type of service to which the client device is to access. In the embodiments of the disclosure, the client device may search for the IP address of the server in the first correspondence table saved by the client device, and does not need to obtain the IP address of the server from the proxy server or the DNS server. Hence, the problems of high cost and low reliability caused by the fault of the proxy server or the DNS server or a change of the IP address are resolved effectively, the cost of IP management is reduced, and the reliability of the system is improved.

Figure 2:
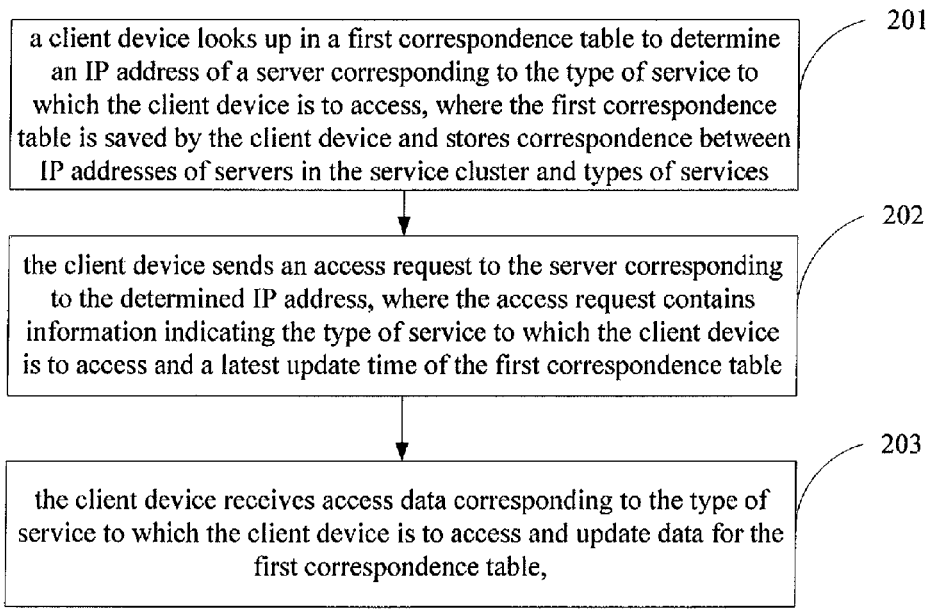
FIG. 2 is a schematic flowchart of an IP management method according to another embodiment of the disclosure.

FIG. 2 is a schematic flowchart of an IP management method according to another embodiment of the disclosure, and the method includes following steps 201 to 203.

In step 201, a client device looks up in a first correspondence table to determine an IP address of a server corresponding to the type of service to which the client device is to access, where the first correspondence table is saved by the client device and stores correspondence between IP addresses of servers in the service cluster and types of services.

In step 202, the client device sends an access request to the server corresponding to the determined IP address, where the access request contains information indicating the type of service to which the client device is to access and a latest update time of the first correspondence table.

In step 203, the client device receives access data corresponding to the type of service to which the client device is to access and update data for the first correspondence table, which are fed back by the server, where the update data represents data updated in a second correspondence table during a period from the latest update time of the first correspondence table to a current time, and the second correspondence table is saved in the server and stores correspondence between IP addresses of servers and types of services in a service cluster.

In the embodiment of the disclosure, after the client device sends the access request to the server, the server determines the access data based on the type of service contained in the access request, and obtains update data for the first correspondence table based on the data updated in the second correspondence table mostly recently, where the update data represents data updated in the second correspondence table during a period from the latest update time of the first correspondence table to the current time. For example, the server takes data updated in the second correspondence table during a period from 8:00 AM to 10:00 AM as the update data for the first correspondence table in a case that latest update time of the first correspondence table is saved as 8:00 AM by the client device and the current time is 10:00 AM.

If the update data contains a to-be-added correspondence between IP address(es) of server(s) and type(s) of service(s), the to-be-added correspondence is added to the first correspondence table.

The to-be-added IP address is already added in the second correspondence table saved by the server in the service cluster but is not saved in the first correspondence table saved by the client device yet.

If the update data contains a to-be-deleted IP address of a server, the correspondence between the IP address of the server and the type of service is deleted from the first correspondence table.

The IP address of the server, which is to be deleted, is already deleted from the second correspondence table saved by the server and is not deleted from the first correspondence table saved by the client device yet.

In the embodiment of the disclosure, the first correspondence table is updated with the update data sent by the server, thereby keeping the synchronization between the first correspondence table saved by the client device and the second correspondence table saved in the server.

In the embodiment of the disclosure, the client device wishing to access a service may look up in the first correspondence table saved by the client device, determines an IP address of a server corresponding to the type of the service to which the client device is to access, and sends an access request to the server corresponding to the determined IP address. The access request contains information indicating the type of service to which the client device is to access and the latest update time of the first correspondence table saved by the client device. The client device may receive access data corresponding to the type of service to which the client device is to access and update data for the first correspondence table, which are fed back by the server. The update data represents data updated in a second correspondence table during a period from the latest update time of the first correspondence table to a current time. In a case that the update data contains a to-be-added correspondence between IP address of server and the type of service, the client device adds the to-be-added correspondence to the first correspondence table. If the update data contains a to-be-deleted IP address of a server, the correspondence between the to-be-deleted IP address and the type of service is deleted from the first correspondence table. The client device can determine the IP address of the server capable of providing the type of service to be accessed based on the first correspondence table saved by itself, so that the client device does not need obtain the IP address of the server from a proxy server or a DNS server. Hence, the problems of high cost and low reliability caused by the fault in the proxy server or the DNS server or a change of the IP address are resolved effectively, the cost of IP management is reduced, and the reliability of the system is improved. In addition, the server may feed back update data for the first correspondence table in the client device so that the first correspondence table can be updated based on the update data and the first correspondence table is synchronized with the second correspondence table in the server.

Figure 3:
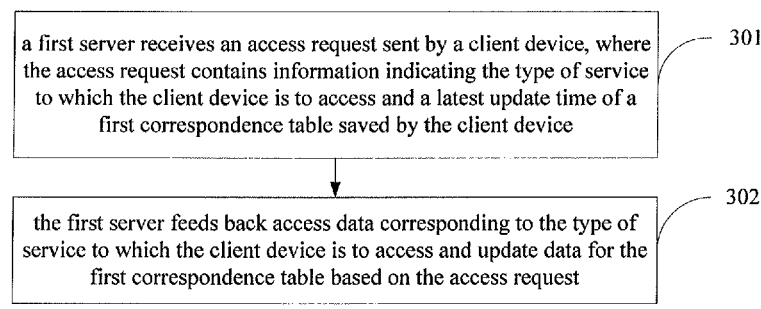
FIG. 3 is a schematic flowchart of an IP management method according to yet another embodiment of the disclosure.

FIG. 3 is a schematic flowchart of an IP management method according to yet another embodiment of the disclosure, and the method includes following steps 301 to 302.

In step 301, a first server receives an access request sent by a client device, where the access request contains information indicating the type of service to which the client device is to access and a latest update time of a first correspondence table saved by the client device, where the first correspondence table is saved in the client device and stores correspondence between IP addresses of servers and types of services in the service cluster.

In the embodiment of the disclosure, taking the first server as an example, the first server may be any one of the servers in the service cluster. The first server receives access request from the client device, where the access request contains information indicating the type of service to which the client device is to access and the latest update time of the first correspondence table saved by the client device, the first correspondence table is saved by the client device and stores correspondence between IP addresses of servers and types of services in the service cluster.

In step 302, the first server feeds back access data corresponding to the type of service to which the client device is to access and update data for the first correspondence table based on the access request.

In the embodiment of the disclosure, after receiving the access request, the first server determines, based on the type of service to which the client device is to access, access data corresponding to the type of service, and determines update data for the first correspondence table based on the latest update time of the first correspondence table saved by the client device, where the type of service is contained in the access request, and the latest update time is contained in the access request. The update data represents data updated in a second correspondence table during a period from the latest update time of the first correspondence table to current time so that the client device can make the first correspondence table be synchronized with the second correspondence table based on the update data. The second correspondence table is saved in the first server for storing correspondence between IP addresses of servers in the service cluster and types of services.

For example, the first server takes data which is updated in the second correspondence table during a period from 8:00 AM to 10:00 AM as the update data for the first correspondence table, in a case that the latest update time of the first correspondence table saved by the client device is 8:00 AM and current time is 10:00 AM.

In the embodiment of the disclosure, the first server feeds back access data corresponding to the type of service to which the client device is to access and the update data for the first correspondence table saved by the client device to the client device sending the access request so that the client device can update the first correspondence table based on the update data for the first correspondence table. The update data may include the to-be-added correspondence between IP address(es) of server(s) and type(s) of service(s) and/or the IP address of the server to be deleted from the first correspondence table.

For example, if the update data for the first correspondence table contains a to-be-added correspondence between IP address(es) of server(s) and type(s) of service(s), the to-be-added correspondence is added to the first correspondence table. The IP address of the server to be added refers to the IP address of the server which is already added to the second correspondence table saved by the server in the service cluster but is not saved in the first correspondence table saved by the client device yet. If the update data for the first correspondence table contains a to-be-deleted IP address of a server, the correspondence between the IP address of the server and the type of service is deleted from the first correspondence table, where the IP address of the server, which is to be deleted, is already deleted from the second correspondence table saved by the server and is not deleted from the first correspondence table saved by the client device yet.

In the embodiment of the disclosure, the access request sent by the client device is received by the first server, the access request contains information indicating the type of service to which the client device is to access and the latest update time of the first correspondence table saved by the client device, and the first server feeds back access data corresponding to the type of service to which the client device is to access and the update data for the first correspondence table to the client device based on the access request, so that the client device can update the first correspondence table based on the update data and keep the first correspondence table synchronized with the second correspondence table saved by the first server. Hence, the client device may search for a server capable of providing required service based on the first correspondence table, and does not need to obtain the IP address of the server from the proxy server of the DNS server, thereby efficiently solving the problems of high cost and low reliability caused by fault of the proxy server or the DNS server or a change of the IP address, reducing the cost of IP management efficiently, and improving the stability of the system.

Figure 4:
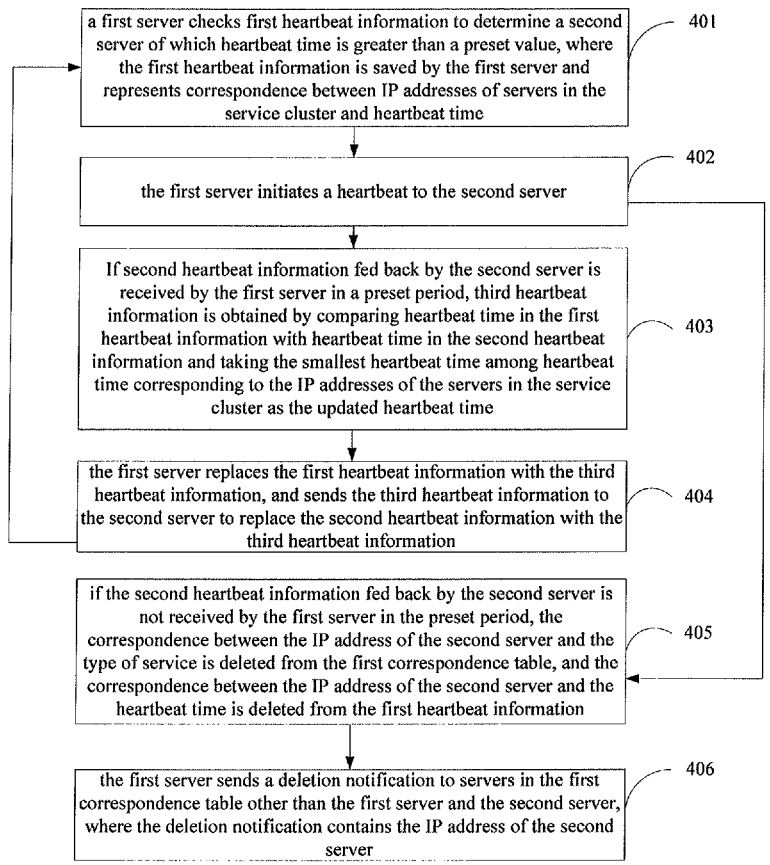
FIG. 4 is a schematic flowchart of an IP management method according to yet another of the disclosure.

In the embodiment of the disclosure, the servers in the service cluster may also determine whether there is transmission failure in server(s) by sending heartbeat to each other, so as to delete the IP address of the server in fault from the second correspondence table saved by the servers in time and implement the management of the IP addresses of the servers in the service cluster. FIG. 4 is a schematic flowchart of an IP management method according to another embodiment of the disclosure, and the method includes following steps 401 to 406.

In step 401, a first server checks first heartbeat information to determine a second server of which heartbeat time is greater than a preset value, where the first heartbeat information is saved by the first server and represents correspondence between IP addresses of servers in the service cluster and heartbeat time.

Figure 5A:
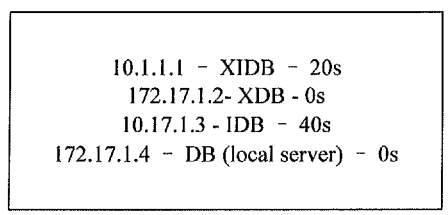
FIG. 5a is a schematic diagram of first heartbeat information according to an embodiment of the disclosure.

In the embodiment of the disclosure, the first server checks first heartbeat information at predetermined points or at a predetermined interval to determine a server of which heartbeat time is greater than a preset value, where the first heartbeat information is saved by the first server and represents correspondence between IP addresses of servers in the service cluster and heartbeat time. For example, FIG. 5*a* shows the first heartbeat information saved by a server with the IP address of 172.17.1.4. Assuming the preset value is 15 seconds, the heartbeat time of the servers 10.1.1.1 and 10.17.1.3 is greater than the preset value and a set of determined servers contains the two servers.

It should be noted that, in the embodiment of the disclosure, each server in the service cluster contains the correspondence between the IP addresses of all the servers in the service cluster and the types of services, i.e., the second correspondence table, and each server in the service cluster contains the correspondence between the IP addresses of all the servers in the service cluster and heartbeat time, i.e., heartbeat information.

In step 402, the first server initiates a heartbeat to the second server.

In the embodiment of the disclosure, an empty set of servers means that no server has heartbeat time greater than the preset value and it is not needed to update the heartbeat information in the first server.

In step 403, in a case that second heartbeat information fed back by the second server is received by the first server in a preset period, where the second heartbeat information is saved by the second server and represents correspondence between IP addresses of servers in the service cluster and heartbeat time, third heartbeat information is obtained by comparing heartbeat time in the first heartbeat information with heartbeat time in the second heartbeat information and taking the smallest heartbeat time among heartbeat time corresponding to the IP addresses of the servers in the service cluster as the updated heartbeat time.

Figure 5B:
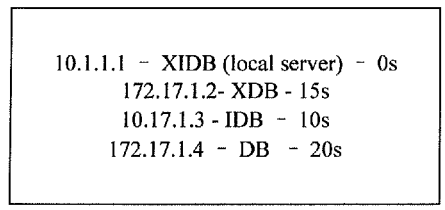
FIG. 5b is a schematic diagram of second heartbeat information according to an embodiment of the disclosure.
Figure 5C:
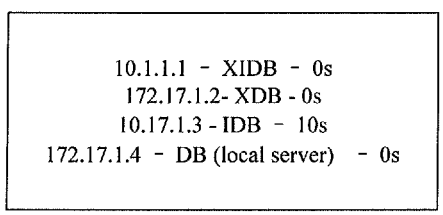
FIG. 5c is a schematic diagram of third heartbeat information according to an embodiment of the disclosure.

For example, assuming that the first heartbeat information in the first server is as shown in FIG. 5*a* and the second heartbeat information in the second server is as shown in FIG. 5*b*, the third heartbeat information shown in FIG. 5*c* may be obtained by combing the first heartbeat information shown in FIG. 5*a* and the second heartbeat information shown in FIG. 5*b*.

In step 404, the first server replaces the first heartbeat information with the third heartbeat information, and sends the third heartbeat information to the second server to replace the second heartbeat information with the third heartbeat information.

It should be noted that, after the first server and the second server replace original heartbeat information with the third heartbeat information, the heartbeat information saved by the first server is still referred to as the first heartbeat information and the heartbeat information saved by the second server is still referred to as the second heartbeat information. In order to avoid the case that the first heartbeat information in the first server still includes the server of which heartbeat time is greater than the above-described preset value, the first server may return to step 401 till the set of the servers obtained by the first server becomes an empty set.

In step 405, the correspondence between the IP address of the second server and the type of service is deleted from the first correspondence table, and the correspondence between the IP address of the second server and the heartbeat time is deleted from the first heartbeat information, in a case that the second heartbeat information fed back by the second server is not received by the first server in the preset period.

In the embodiment of the disclosure, after the first server initiates heartbeat to the second server, the first server can determine that the second server encounters failure if the second heartbeat information fed back by the second server is not received by the first server in the preset period, deletes the correspondence between the IP address of the second server and the type of service from the first correspondence table saved by the first server, and deletes the correspondence between the IP address of the second server and heartbeat time from the first heartbeat information in the first server.

In step 406, the first server sends a deletion notification to servers in the first correspondence table other than the first server and the second server, where the deletion notification contains the IP address of the second server.

In the embodiment of the disclosure, in order to make other sever delete information related to the second server, the first server sends a deletion notification to servers in the first correspondence table other than the first server and the second server. The deletion notification contains the IP address of the second server so that other servers delete the correspondence between the IP address of the second server and the type of service from the saved second correspondence tables and delete the correspondence between the IP address of the second server and the heartbeat time from the heartbeat information after the deletion notification is received by other servers.

In the embodiment of the disclosure, heartbeat initiated by other servers may also be received by the first server. For example, if the first server receives heartbeat initiated by a third server and the heartbeat contains the correspondence between an IP address of the third server and the type of service, the first server checks the heartbeat information saved by the first server and sends the first heartbeat information saved by the first server to the third server in the case that the IP address of the third server is found in the first heartbeat information saved by the first server, so that the third server may combine the first heartbeat information with heartbeat information saved by the third server. In a case that the first heartbeat information saved by the first server does not contain the IP address of the third server, the first server determines that the third server is a server newly added to the service cluster, adds the correspondence between the IP address of the third server and the type of service to the first correspondence table and adds the IP address of the third server to the first heartbeat information; after the IP address of the third server is added to the first heartbeat information, timing begins for the third server in the first heartbeat information to obtain heartbeat time corresponding to the third server; and the first server sends an adding notification to servers in the first correspondence table other than the first server and the third server, where the adding notification contains the correspondence between the IP address of the third server and the type of service so that other servers can add the correspondence between the IP address of the third server and the type of service to the second correspondence table saved by the other servers and add the IP address of the third server to the heartbeat information saved by the other servers, to update the second correspondence table and heartbeat information saved by the servers in the service cluster synchronously.

In the embodiment of the disclosure, the first server may also receive a deletion notification or an adding notification sent by other servers. If the first server receives a deletion notification sent by the third server, where the deletion notification contains the IP address of a fourth server, the first server deletes the correspondence between the IP address of the fourth server and the type of service from the second correspondence table saved by the first server and deletes the correspondence between the IP address of the fourth server and heartbeat time from the first heartbeat information saved by the first server; if the first server receives an adding notification sent by the third server, where the adding notification contains the correspondence between the IP address of a fifth server and the type of service, the first server adds the correspondence between the IP address of the fifth server and the type of service to the second correspondence table saved by first server and adds the IP address of the second server to the first heartbeat information saved by the first server.

According to the technical solution provided according to the embodiment of the disclosure, the servers in the service cluster may determine whether any server encounters failure by initiating heartbeats to each other, other servers in the service cluster delete information related to the server(s) encountering failure, thereby managing servers in the service cluster effectively.

A client device, a server and a system for performing the IP management method will be described in detail as follow.

Figure 6:
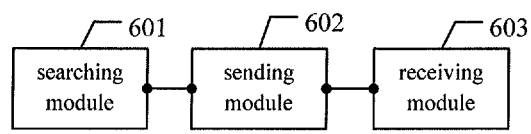
FIG. 6 is a schematic structural diagram of a client device according to an embodiment of the disclosure.

FIG. 6 is a schematic structural diagram of a client device according to an embodiment of the disclosure, and the client device includes a searching module 601, a sending module 602 and a receiving module 603:

the searching module 601 is configured for looking-up in a first correspondence table to determine an IP address of a server corresponding to a type of service to which the client device is to access, where the first correspondence table is synchronized with the second correspondence table, the first correspondence table is saved by the client device and stores correspondence between IP addresses of servers in the service cluster and types of services, and the second correspondence table is saved by the server and stores correspondence between IP addresses of servers in the service cluster and types of services;

the sending module 602 is configured to send an access request to the server corresponding to the determined IP address after the searching module determines the IP address of the server, where the access request includes the type of service to which the client device is to access; and the receiving module 603 is configured to receive access data fed back by the server after the sending module sends the access request, where the access data corresponds to the type of service to which the client device is to access.

In the embodiment of the disclosure, if the client device wishes to access a service, the searching module 601 in the client device looks up in the first correspondence table to determine the IP address of the server corresponding to the type of service to which the client device is to access; next, the sending module 602 sends the access request to the server corresponding to the determined IP address, where the access request contains information indicating the type of service to which the client device is to access; finally, the receiving module 603 receives access data fed back by the server, where the access data corresponds to the type of service to which the client device is to access.

In the embodiment of the disclosure, in a case that the client device is to access service, the client device looks up in a first correspondence table to determine an IP address of a server corresponding to the type of service to which the client device is to access, where the first correspondence table is synchronized with the second correspondence table, the first correspondence table is saved by the client device and stores correspondence between IP addresses of servers in the service cluster and types of services, and the second correspondence table is saved by the server and stores correspondence between IP addresses of servers in the service cluster and types of services; the client device may send an access request to the server corresponding to the determined IP address, where the access request contains information indicating the type of service to which the client device is to access; and the client device receives access data which is fed back by the server and corresponds to the type of service to which the client device is to access. The first correspondence table is synchronized with the second correspondence table saved by the server so that the client device can search for the IP address of the server based on the first correspondence table saved by the client device per se, and does not need to obtain the IP address of the server from the proxy server of the DNS server, thereby solving the problems of high cost and low reliability caused by fault of the proxy server or the DNS server or a change of the IP address, reducing the cost of IP management efficiently, and improving the stability of the system.

Figure 7:
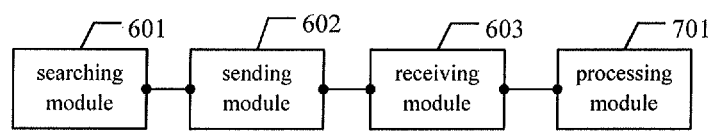
FIG. 7 is a schematic structural diagram of a client device according to another embodiment of the disclosure.

FIG. 7 is a schematic structural diagram of a client device according to another embodiment of the disclosure, and the client device includes a searching module 601, a sending module 602, a receiving module 603 and a processing module 701.

The searching module 601, the sending module 602 and the receiving module 603 described in the embodiment as shown in FIG. 7 are similar to those described in the embodiment as shown in FIG. 6, which are not described here.

In the embodiment of the disclosure, the access request contains information indicating a latest update time of the first correspondence table.

The receiving module 603 is configured to receive access data corresponding to the type of service to which the client device is to access and update data for the first correspondence table, which are fed back by the server, where the update data represents data updated in a second correspondence table during a period from the time when the second correspondence table is updated last time to a current time.

The processing module 701 is configured to add, once the update data fed back by the server is received by the receiving module and the update data contains a to-be-added correspondence, the to-be-added correspondence to the first correspondence table; and to delete a to-be-deleted correspondence from the first correspondence table in a case that the update data contains the to-be-deleted correspondence.

In the embodiment of the disclosure, if the client device wishes to access a service, the searching module 601 in the client device looks up in the first correspondence table to determine the IP address of the server corresponding to the type of service to which the client device is to access; next, the sending module 602 sends the access request to the server corresponding to the determined IP address, where the access request contains information indicating the type of service to which the client device is to access and a latest update time of the first correspondence table; and the receiving module 603 receives access data corresponding to the type of service to which the client device is to access and update data for the first correspondence table. The update data is data updated in the second correspondence table during a period from the time when the second correspondence table is updated last time to a current time. The processing module 701 adds a to-be-added correspondence between an IP address of a server and the type of service to the first correspondence table, in a case that the update data contains the to-be-added correspondence; the processing module 701 deletes a to-be-deleted correspondence between an IP address of a server to be deleted and the type of service from the first correspondence table, in a case that the update data contains the IP address of the server to be deleted.

In the embodiment of the disclosure, if the client device wishes to access a service, the client device may look up in the first correspondence table saved by the client device and determine the IP address of the server corresponding to the type of service to which the client device is to access; next, the client device sends the access request to the server corresponding to the determined IP address, where the access request contains information indicating the type of service to which the client device is to access and the latest update time of the first correspondence table saved by the client device; and the client device may receive access data corresponding to the type of service to which the client device is to access and update data for the first correspondence table. The update data represents data updated in a second correspondence table during a period from a latest update time of the first correspondence table to a current time. The client device adds a to-be-added correspondence between an IP address of a server and the type of service to the first correspondence table, in a case that the update data contains the to-be-added correspondence; the client device deletes a to-be-deleted correspondence between an IP address of a server to be deleted and the type of service from the first correspondence table, in a case that the update data contains the IP address of the server to be deleted. The client device can determine the IP address of the server capable of providing access based on the first correspondence table saved by the client device per se, so that the client device does not need obtain the IP address of the server from a proxy server or a DNS server, thereby efficiently solving the problems of high cost and low reliability caused by fault of the proxy server or the DNS server or a change of the IP address, reducing the cost of IP management efficiently, and improving the stability of the system. The server may also feed back update data for the first correspondence table in the client device so that the first correspondence table can be updated based on the update data and the first correspondence table is synchronized with the second correspondence table in the server.

Figure 8:
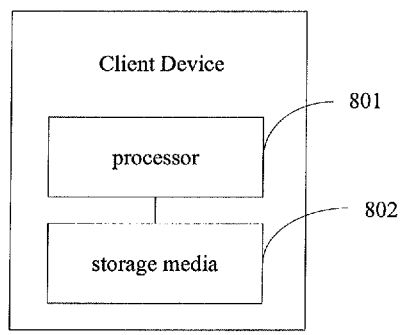
FIG. 8 is a schematic structural diagram of a client device according to yet another embodiment of the disclosure.

FIG. 8 is a schematic structural diagram of a client device according to another embodiment of the disclosure, and the client device includes one or more processors 801 and storage media 802 storing instructions, where when executing the instructions, the one or more processors 801 are configured for:

looking-up in a first correspondence table to determine an IP address of a server corresponding to the type of service to which the client device is to access, where the first correspondence table is saved by the client device and stores correspondence between IP addresses of servers and types of services in a service cluster;

sending, an access request to the server corresponding to the determined IP address, where the access request includes the type of service to which the client device is to access; and receiving, access data fed back by the server, where the access data corresponds to the type of service to which the client device is to access.

In a case that the access request also contains information indicating a latest update time of the first correspondence table, the one or more processors 801 are further configured for:

receiving update data for the first correspondence table fed back by the server, where the update data is represents data updated in a second correspondence table during a period from a latest update time of the first correspondence table to a current time, and the second correspondence table is saved by the server and stores correspondence between IP addresses of servers and types of services in the service cluster.

The update data for the first correspondence table includes a to-be-added correspondence, and the one or more processors 801 are further configured for:

adding the to-be-added correspondence to the first correspondence table.

The update data for the first correspondence table includes a to-be-deleted correspondence, and the one or more processors 801 are further configured for:

deleting the to-be-deleted correspondence from the first correspondence table.

Figure 9:
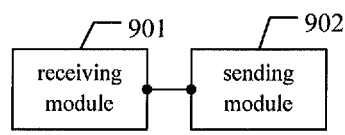
FIG. 9 is a schematic structural diagram of a server according to an embodiment of the disclosure.

Referring to FIG. 9, FIG. 9 shows a structure of a server according to an embodiment of the disclosure, including:

a receiving module 901, configured to receive an access request sent by a client device, where the access request contains information indicating the type of service to which the client device is to access and a latest update time of a first correspondence table saved by the client device, where the first correspondence table is saved by the client device and stores correspondence between IP addresses of servers in the service cluster and types of services; and a sending module 902, configured to feed back access data corresponding to the type of service to which the client device is to access and update data for the first correspondence table based on the access request, where the update data represents data updated in a second correspondence table during a period from a latest update time of the first correspondence table to current time so that the client device can synchronize the first correspondence table with the second correspondence table based on the update data, where the second correspondence table is saved by the first server and stores correspondence between IP addresses of servers in the service cluster and types of services.

In the embodiment of the disclosure, after the access request sent by the client device is received by the first server, where the access request contains information indicating the type of service to which the client device is to access and the latest update time of the first correspondence table saved by the client device, the first server feeds back access data corresponding to the type of service to which the client device is to access and the update data for the first correspondence table to the client device based on the access request, so that the client device can update the first correspondence table based on the update data and the first correspondence table is synchronized with the second correspondence table saved by the first server, but not need to obtain the IP address of the server from the proxy server of the DNS server, thereby efficiently solving the problems of high cost and low reliability caused by fault of the proxy server or the DNS server or a change of the IP address, reducing the cost of IP management efficiently, and improving the stability of the system.

Figure 10:
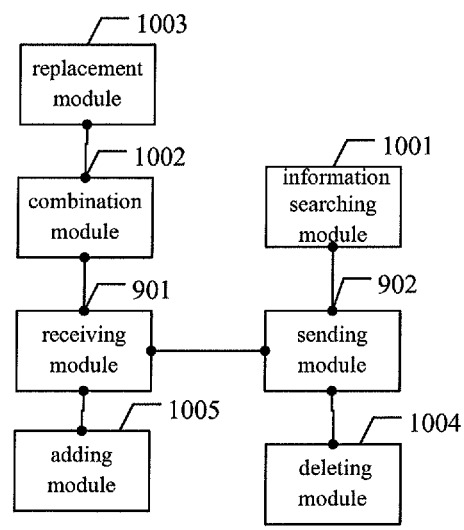
FIG. 10 is a schematic structural diagram of a server according to another embodiment of the disclosure.

FIG. 10 is a schematic structural diagram of a server according to another embodiment of the disclosure. The server includes a receiving module 901 and a sending module 902, which are similar to those as shown in FIG. 9 and are not repeated here. In addition, the server further includes an information searching module 1001.

In the embodiment of the disclosure, the update data includes a correspondence to be added to the first correspondence table and/or the IP address of the server to be deleted from the first correspondence table.

The information searching module 801 is configured to check the first heartbeat information first heartbeat information to determine in the service cluster a second server of which heartbeat time is greater than a preset value, where the first heartbeat information is saved by the first server and represents correspondence between IP addresses of servers in the service cluster and heartbeat time;

the sending module 902 is further configured to initiate heartbeat to the second server; and the receiving module 901 is further configured to receive second heartbeat information fed back by the second server within a preset period, where the second heartbeat information is saved by the second server and represents correspondence between IP addresses of servers in the service cluster and heartbeat time;

the server further includes a combination module 1002 and a replacement module 1003:

the combination module 1002 is configured to combine heartbeat time of the first heartbeat information with heartbeat time of the second heartbeat information, take the smallest ones among the heartbeat time corresponding to the IP address of the server as the updated heartbeat time to obtain third heartbeat information; and the replacement module 1003 is configured to replace the first heartbeat information with the third heartbeat information, and send the third heartbeat information to the second server so that the second server replaces the second heartbeat information with the third heartbeat information.

In the embodiment of the disclosure, the server further includes:

a deleting module 1004, configured to delete the correspondence between the IP address of the second server and the type of service from the first correspondence table, and delete the correspondence between the IP address of the second server and the heartbeat time from the first heartbeat information, in a case that the second heartbeat information fed back by the second server is not received by the receiving module 901 in the preset period.

The sending module 902 is further configured to send a deletion notification to servers in the first correspondence table other than the first server and the second server, where the deletion notification contains the IP address of the second server.

In the embodiment of the disclosure, the receiving module 901 is further configured to receive heartbeat initiated by a third server, where the heartbeat contains the correspondence between an IP address of the third server and the type of service.

The sending module 902 is further configured to send the first heartbeat information to the third server in a case that the first heartbeat information contains the IP address of the third server.

In the embodiment of the disclosure, the server further includes:

an adding module 1005, configured to add the correspondence between the IP address of the third server and the type of service to the first correspondence table and add the IP address of the third server to the first heartbeat information, in a case that the first heartbeat information does not contain the IP address of the third server.

The sending module 902 is further configured to send an adding notification to servers in the first correspondence table other than the first server and the third server, where the adding notification contains the correspondence between the IP address of the third server and the type of service.

In the embodiment of the disclosure, the receiving module 901 is further configured to receive a deletion notification sent by the third server, where the deletion notification contains an IP address of a fourth server, and the receiving module 901 is configured to receive an adding notification sent by the third server, where the adding notification contains the correspondence between an IP address of a fifth server and the server.

In this case, the deleting module 1004 is further configured to delete the correspondence between the IP address of the fourth server and the type of service from the second correspondence table, and delete the correspondence between the IP address of the fourth server and the heartbeat time from the first heartbeat information.

In this case, the adding module 1005 is further configured to add the correspondence between the IP address of the fifth server and the type of service to the second correspondence table, and add the IP address of the second server to the first heartbeat information.

In the embodiment of the disclosure, the receiving module 901 in the server receives an access request sent by a client device, where the access request contains information indicating the type of service to which the client device is to access and a latest update time of a first correspondence table saved by the client device, where the first correspondence table is saved by the client device and stores correspondence between IP addresses of servers in the service cluster and types of services; and the sending module feeds back access data corresponding to the type of service to which the client device is to access and update data for the first correspondence table to the client device based on the access request, where the update data is data updated in the second correspondence table during a period from the time when the second correspondence table is updated last time to a current time, so that the client device can synchronize the first correspondence table with the second correspondence table based on the update data, where the second correspondence table is saved by the first server and stores correspondence between IP addresses of servers in the service cluster and types of services.

In the embodiment of the disclosure, the information searching module 1001 in the server checks the first heartbeat information to determines a second server of which heartbeat time is greater than a preset value, where the first heartbeat information is saved by the first server and represents correspondence between IP addresses of servers in the service cluster and heartbeat time; the sending module 902 initiates heartbeat to the second server; and the receiving module 901 receives second heartbeat information fed back by the second server in a preset period, where the second heartbeat information is saved by the second server and represents correspondence between IP addresses of servers in the service cluster and heartbeat time; next, the combination module 1002 combines heartbeat time of the first heartbeat information with heartbeat time of the second heartbeat information, takes the smallest ones among the heartbeat time corresponding to the IP address of the server as the updated heartbeat time to obtain third heartbeat information; and the replacement module 1003 replaces the first heartbeat information with the third heartbeat information, and sends the third heartbeat information to the second server, so that the second server replaces the second heartbeat information with the third heartbeat information. In a case that the second heartbeat information fed back by the second server is not received by the receiving module 901 in the preset period, the deleting module 1004 deletes the correspondence between the IP address of the second server and the type of service from the first correspondence table, and deletes the correspondence between the IP address of the second server and the heartbeat time from the first heartbeat information, and the sending module 902 sends a deletion notification to servers in the first correspondence table other than the first server and the second server, where the deletion notification contains the IP address of the second server.

In the embodiment of the disclosure, the receiving module 901 in the server receives heartbeat initiated by a third server, where the heartbeat contains the correspondence between an IP address of the third server and the type of service. The sending module 902 sends the first heartbeat information to the third server in a case that the first heartbeat information contains the IP address of the third server. In a case that the first heartbeat information does not contain the IP address of the third server, the adding module 1005 adds the correspondence between the IP address of the third server and the type of service to the first correspondence table and adds the IP address of the third server to the first heartbeat information, and the sending module 902 sends an adding notification to servers in the first correspondence table other than the first server and the third server, where the adding notification contains the correspondence between the IP address of the third server and the type of service.

In the embodiment of the disclosure, the receiving module 901 receives a deletion notification sent by the third server, where the deletion notification contains an IP address of a fourth server, the deleting module 1004 deletes the correspondence between the IP address of the fourth server and the type of service from the second correspondence table, and deletes the correspondence between the IP address of the fourth server and the heartbeat time from the first heartbeat information.

In the embodiment of the disclosure, the receiving module 901 receives the adding notification sent by the third server, where the adding notification contains the correspondence between an IP address of a fifth server and the server; and the adding module 1005 adds the correspondence between the IP address of the fifth server and the type of service to the second correspondence table, and adds the IP address of the second server to the first heartbeat information.

In the embodiment of the disclosure, the first server checks the first heartbeat information to determine a second server of which the heartbeat time is greater than a preset value; and the first server initiates heartbeat to the second server. In a case that second heartbeat information fed back by the second server is received by the first server within a preset period, the first server combines heartbeat time of the first heartbeat information with heartbeat time of the second heartbeat information, takes the smallest ones in heartbeat time corresponding to the IP addresses of the servers as the updated heartbeat time to obtain third heartbeat information. The first server replaces the first heartbeat information with the third heartbeat information, and sends the third heartbeat information to the second server so that the second server replaces the second heartbeat information with the third heartbeat information. In a case that the second heartbeat information fed back by the second server is not received by the first server in the preset period, the first server deletes the correspondence between the IP address of the second server and the type of service from the first correspondence table, and deletes the correspondence between the IP address of the second server and the heartbeat time from the first heartbeat information, and the first server sends a deletion notification to servers in the first correspondence table other than the first server and the second server. By sending heartbeat to the server of which heartbeat time is greater than the preset value, it is determined whether the server encounters failure, and information related to the server encountering failure is deleted, thereby managing the servers in the service cluster effectively.

Figure 11:
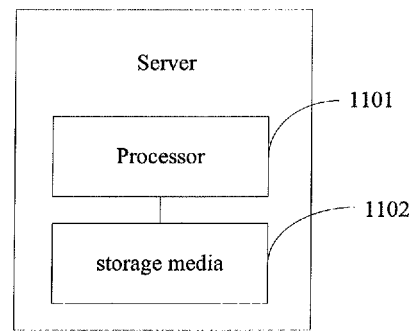
FIG. 11 is a schematic structural diagram of a server according to yet another embodiment of the disclosure.

FIG. 11 is a schematic structural diagram of a server according to another embodiment of the disclosure. The server includes one or more processors 1101 and storage media 1102 storing instructions, where when executing the instructions, the one or more processors 1101 are configured for:

receiving an access request sent by a client device, where the access request includes the type of service to which the client device is to access and a latest update time of a first correspondence table saved by the client device, where the first correspondence table is saved by the client device and stores correspondence between IP addresses of servers in the service cluster and types of services; and feeding back access data corresponding to the type of service to which the client device is to access and update data for the first correspondence table based on the access request, where the update data represents data updated in a second correspondence table during a period from a latest update time of the first correspondence table to current time, and the second correspondence table is saved by the first server and stores correspondence between IP addresses of servers in the service cluster and types of services.

In the embodiment of the disclosure, the one or more processors 1101 are further configured for:

checking first heartbeat information to determine in the service cluster a second server of which heartbeat time is greater than a preset value, where the first heartbeat information is saved by the first server and represents correspondence between IP addresses of servers in the service cluster and heartbeat time;

initiating a heartbeat to the second server;

in a case that second heartbeat information fed back by the second server is received in a preset period, wherein the second heartbeat information is saved by the second server and represents correspondence between IP addresses of servers in the service cluster and heartbeat time, obtaining third heartbeat information by comparing the first heartbeat information with heartbeat time in the second heartbeat information and taking the smallest ones among the heartbeat time corresponding to the IP addresses of the servers in the service cluster as updated heartbeat time; and replacing the first heartbeat information with the third heartbeat information, and sending the third heartbeat information to the second server so that the second server replaces the second heartbeat information with the third heartbeat information.

In the embodiment of the disclosure, the one or more processors 1101 are further configured for:

deleting the correspondence between the IP address of the second server and the type of service from the first correspondence table, and deleting the correspondence between the IP address of the second server and the heartbeat time from the first heartbeat information, in a case that the second heartbeat information fed back by the second server is not received by the first server in the preset period; and sending a deletion notification to servers in the first correspondence table other than the first server and the second server, where the deletion notification includes the IP address of the second server.

In the embodiment of the disclosure, the one or more processors 1101 are further configured for:

receiving a heartbeat initiated by a third server, wherein the heartbeat comprises a correspondence between an IP address of the third server and a type of service; and sending the first heartbeat information to the third server in a case that the first heartbeat information includes the IP address of the third server.

In the embodiment of the disclosure, the one or more processors 1101 are further configured for:

adding the correspondence between the IP address of the third server and the type of service to the first correspondence table and adding the IP address of the third server to the first heartbeat information, in a case that the first heartbeat information does not contain the IP address of the third server; and sending an adding notification to servers in the first correspondence table other than the first server and the third server, where the adding notification contains the correspondence between the IP address of the third server and the type of service.

In the embodiment of the disclosure, an IP management system is provided, including:

several client devices as described in FIG. 6, FIG. 7 or FIG. 8, and several servers as described in FIG. 9, FIG. 10 or FIG. 11, where the several servers constitute a service cluster.

Those skilled in the art should understand that all of or a part of steps of the above method embodiments may be performed by instructing corresponding hardware through a program. The proceeding program may be stored in a computer readable storage medium. The proceeding storage medium includes an ROM, a magnetic disc or an optic disc.

An IP management method, a system, a client device and a server according to the disclosure are described in detail above. Those skilled in the art may make changes to the specific embodiments and the application scope based on the idea of the disclosure. In summary, the specification should not be understood as limitations to the disclosure.

The invention claimed is:

1. An IP management method comprising:

looking up, by a client device, in a first correspondence table to determine an IP address of a server corresponding to a type of service to which the client device is to access, wherein the first correspondence table is saved by the client device and stores correspondence between IP addresses of servers and types of services in a service cluster;

sending, by the client device, an access request to the server corresponding to the determined IP address, wherein the access request comprises information indicating the type of service to which the client device is to access; and receiving, by the client device, a response to the access request that includes access data fed back by the server, wherein the access data corresponds to the type of service to which the client device is to access;

wherein the access request further comprises a latest update time of the first correspondence table, and the method further comprises: receiving in the response, by the client device, update data for the first correspondence table fed back by the server wherein the update data represents all of the data updated in a second correspondence table during a period from the latest update time of the first correspondence table to a current time, and the second correspondence table is saved by the server and stores correspondence between the IP addresses of the servers and the types of services in the service cluster.

2. The method according to claim 1, wherein the update data for the first correspondence table comprises a to-be-added correspondence, and the method further comprises: adding the to-be-added correspondence to the first correspondence table.

3. The method according to claim 1, wherein the update data for the first correspondence table comprises a to-be-deleted correspondence, and the method further comprises: deleting the to-be-deleted correspondence from the first correspondence table.

4. An IP management method comprising:
looking up, by a client device, in a first correspondence table to determine an IP address of a first server corresponding to a type of service to which the client device is to access, wherein the first correspondence table is saved by the client device and stores correspondence between IP addresses of servers and types of services in a service cluster;
receiving, by the first server, an access request sent by the client device, wherein the access request comprises information indicating a type of service to which the client device is to access and a latest update time of the first correspondence table saved by the client device; and
feeding back in a response to the access request, by the first server, access data corresponding to the type of service to which the client device is to access and update data for the first correspondence table based on the access request, wherein the update data represents all of the data updated in a second correspondence table during a period from the latest update time of the first correspondence table to a current time, and the second correspondence table is saved by the first server and stores correspondence between the IP addresses of servers and the types of services in the service cluster.

5. The method according to claim 4, further comprising: checking, by the first server, first heartbeat information to determine in the service cluster a second server of which heartbeat time is greater than a preset value, wherein the first heartbeat information is saved by the first server and represents correspondence between IP addresses of servers in the service cluster and heartbeat time: initiating, by the first server, a heartbeat to the second server; and in a case that second heartbeat information fed back by the second server is received by the first server in a preset period, wherein the second heartbeat information is saved by the second server and represents correspondence between IP addresses of servers in the service cluster and heartbeat time, obtaining third heartbeat information by comparing heartbeat time in the first heartbeat information with heartbeat time in the second heartbeat information and taking the smallest ones among the heartbeat time corresponding to the IP addresses of the servers in the service cluster as updated heartbeat time; and replacing, by the first server, the first heartbeat information with the third heartbeat information, and sending the third heartbeat information to the second server so that the second server replaces the second heartbeat information with the third heartbeat information.

6. The management method according to claim 5, further comprising: deleting the correspondence between the IP address of the second server and the type of service from the first correspondence table, and deleting the correspondence between the IP address of the second server and the heartbeat time from the first heartbeat information, in a case that the second heartbeat information fed back by the second server is not received by the first server in the preset period; and sending a deletion notification to servers in the first correspondence table other than the first server and the second server, wherein the deletion notification comprises the IP address of the second server.

7. The management method according to claim 4, further comprising:
receiving, by the first server, a heartbeat initiated by a third server, wherein the heartbeat comprises a correspondence between an IP address of the third server and a type of service; and sending the first heartbeat information to the third server in a case that the first heartbeat information comprises the IP address of the third server.

8. The management method according to claim 7, further comprising: adding the correspondence between the IP address of the third server and the type of service to the first correspondence table and adding the IP address of the third server to the first heartbeat information, in a case that the first heartbeat information does not comprise the IP address of the third server; and sending an adding notification to servers in the first correspondence table other than the first server and the third server, wherein the adding notification comprises the correspondence between the IP address of the third server and the type of service.

9. A client device comprising:
one or more processors; and
storage media for storing instructions, wherein when executing the instructions, the one or more processors are configured for:
looking-up in a first correspondence table to determine an IP address of a server corresponding to a type of service to which the client device is to access, wherein the first correspondence table is saved by the client device and stores correspondence between IP addresses of servers and types of services in a service cluster;
sending; an access request to the server corresponding to the determined IP address, wherein the access request comprises information indicating the type of service to which the client device is to access; and
receiving; access data fed back by the server in a response to the access request, wherein the access data corresponds to the type of service to which the client device is to access,
wherein in a case that the access request further comprises a latest update time of the first correspondence table, the one or more processors are further configured for:
receiving update data for the first correspondence table fed back by the server in the response, wherein the update data represents all of the data updated in a second correspondence table during a period from a latest update time of the first correspondence table to a current time, and the second correspondence table is saved by the server and stores correspondence between the IP addresses of the servers and the types of services in the service cluster.

10. The client device according to claim 9, wherein the update data for the first correspondence table comprises a to-be-added correspondence, and the one or more processors are further configured for: adding the to-be-added correspondence to the first correspondence table.

11. The client device according to claim 9, wherein the update data for the first correspondence table comprises a to-be-deleted correspondence, and the one or more processors are further configured for: deleting the to-be-deleted correspondence from the first correspondence table.

* * * * *